(12) United States Patent
Turner (10) Patent No.: US 11,476,689 B2
(45) Date of Patent: Oct. 18, 2022

(54) JUMPER BATTERY INTEGRATED INTO A TRANSPORT REFRIGERATION SYSTEM

(71) Applicant: Carrier Corporation, Palm Beach Gardens, FL (US)

(72) Inventor: Greg W. Turner, Nicholson, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 231 days.

(21) Appl. No.: 16/911,553

(22) Filed: Jun. 25, 2020

(65) Prior Publication Data
US 2020/0412162 A1 Dec. 31, 2020

Related U.S. Application Data

(60) Provisional application No. 62/867,638, filed on Jun. 27, 2019.

(51) Int. Cl.
| | | |
|---|---|---|
| H02J 7/00 | (2006.01) | |
| H02J 7/34 | (2006.01) | |
| F25D 11/00 | (2006.01) | |
| B60P 3/20 | (2006.01) | |
| H02J 1/00 | (2006.01) | |
| H02J 1/10 | (2006.01) | |

(52) U.S. Cl.
CPC ............ *H02J 7/0063* (2013.01); *B60P 3/20* (2013.01); *F25D 11/003* (2013.01); *H02J 1/001* (2020.01); *H02J 1/122* (2020.01); *H02J 7/342* (2020.01)

(58) Field of Classification Search
CPC .......... H02J 7/0063; H02J 1/122; H02J 1/001; H02J 7/342; B60P 3/20; F25D 11/003
See application file for complete search history.

(56) References Cited

U.S. PATENT DOCUMENTS

| | | | |
|---|---|---|---|
| 5,107,197 A | 4/1992 | Arlinghaus | |
| 5,977,744 A * | 11/1999 | Williams | H02J 7/1423 320/104 |
| 6,396,240 B1 | 5/2002 | Kahlon et al. | |
| 7,339,347 B2 | 3/2008 | Elder et al. | |
| 7,673,466 B2 | 3/2010 | Pacy | |
| 8,935,933 B1 | 1/2015 | Koelsch | |
| 9,389,007 B1 | 7/2016 | Mckay | |
| 9,506,446 B2 | 11/2016 | Xinfang | |
| 9,718,419 B2 | 8/2017 | Proebstle | |
| 9,770,992 B2 | 9/2017 | Nook et al. | |
| 9,912,183 B2 | 3/2018 | Kokot, Jr. et al. | |
| 10,160,325 B2 | 12/2018 | Lee et al. | |
| 10,256,649 B2 | 4/2019 | Proebstle et al. | |
| 2002/0022159 A1 | 2/2002 | Pierson et al. | |

(Continued)

FOREIGN PATENT DOCUMENTS

| | | |
|---|---|---|
| AU | 2018100813 A4 | 7/2018 |
| WO | 20140142759 A1 | 9/2014 |
| WO | 20170218910 A2 | 12/2017 |

*Primary Examiner* — Carlos Amaya
(74) *Attorney, Agent, or Firm* — Cantor Colburn LLP (57) ABSTRACT

Disclosed is a transport refrigeration system including: an engine that is dedicated to the transport refrigeration system; a primary battery that is dedicated to the transport refrigeration system, the primary battery being electrically connected to the engine; and a jumper battery electrically connected to the primary battery, the jumper battery configured to automatically boost the primary battery when the primary battery fails to start the engine.

13 Claims, 5 Drawing Sheets

(56) References Cited

U.S. PATENT DOCUMENTS

| | | | |
|---|---|---|---|
| 2012/0159971 A1* | 6/2012 | Fink | B60P 3/20 |
| | | | 62/190 |
| 2015/0274056 A1* | 10/2015 | Olaleye | B60H 1/00428 |
| | | | 62/115 |
| 2016/0308379 A1 | 10/2016 | Pan | |
| 2017/0066342 A1 | 3/2017 | Butler et al. | |
| 2017/0338678 A1 | 11/2017 | Yang et al. | |
| 2018/0301919 A1 | 10/2018 | Rumbaugh et al. | |
| 2019/0052107 A1 | 2/2019 | Park | |
| 2020/0370527 A1* | 11/2020 | Sturtevent | F02N 11/0803 |

* cited by examiner

JUMPER BATTERY INTEGRATED INTO A TRANSPORT REFRIGERATION SYSTEM

CROSS-REFERENCE TO RELATED APPLICATIONS

This application claims the benefit of U.S. Provisional Application 62/867,638 filed Jun. 27, 2019, the disclosure of which is incorporated herein by reference in its entirety.

BACKGROUND

The disclosed embodiments relate to transportation refrigeration systems and more specifically to a jumper battery integrated into the transport refrigeration system.

Fruits, vegetables and other perishable items, including meat, poultry and fish, fresh or frozen, are commonly transported in a transport refrigeration system (TRS). The TRS may include a refrigerated container, for example a cargo box of a truck in the form of a trailer, or in an intermodal container. Accordingly, it is customary to provide a transport refrigeration system in operative association with the refrigerated container for cooling the atmosphere within the refrigerated container. The TRS includes a refrigerant vapor compression system, also referred to as a transport refrigeration unit (TRU), and an on-board power unit. The refrigerant vapor compression system typically includes a compressor, a condenser, an expansion device and an evaporator serially connected by refrigerant lines in a closed refrigerant circuit in accord with known refrigerant vapor compression cycles. The power unit includes an engine, typically diesel powered.

Customers of a transport refrigeration unit (TRU) may struggle with battery maintenance. When a TRU has battery issues, it is typically required that an external jumper battery be brought to the unit to jump the TRU.

SUMMARY OF THE DISCLOSED EMBODIMENTS

Disclosed is a transport refrigeration system comprising: an engine that is dedicated to the transport refrigeration system; a primary battery that is dedicated to the transport refrigeration system, the primary battery being electrically connected to the engine; and a jumper battery electrically connected to the primary battery, the jumper battery configured to automatically boost the primary battery when the primary battery fails to start the engine.

In addition to one or more of the above features, or as an alternate: the engine, the primary battery and the jumper battery are connected in parallel in a first parallel circuit.

In addition to one or more of the above features, or as an alternate, the engine and the jumper battery are connected in parallel in a second parallel circuit.

In addition to one or more of the above features, or as an alternate, the system includes an engine controller configured to identify engine faults and determine when the engine fails to start.

In addition to one or more of the above features, or as an alternate, the engine controller, the engine, the primary battery and the jumper battery are connected in parallel in the first parallel circuit.

In addition to one or more of the above features, or as an alternate, the engine controller, the engine and the jumper battery are connected in parallel in the second parallel circuit.

In addition to one or more of the above features, or as an alternate, the engine includes a starter; the first parallel circuit includes a first positive path and a first negative path; and the first positive path is connected at the engine to the starter.

In addition to one or more of the above features, or as an alternate, the engine includes an alternator; the second parallel circuit includes a second positive path and the first negative path; and the second positive path is connected at the engine to the alternator.

In addition to one or more of the above features, or as an alternate, the system includes a system controller configured to communicate with the engine controller and the jumper battery by respective communication paths and control the jumper battery to boost the primary battery when the engine fails to start.

In addition to one or more of the above features, or as an alternate, the system includes a display that is dedicated to the transport refrigeration system, wherein the engine controller is connected by a communication path to the display to provide an alert when the jumper battery is controlled to boost the primary battery.

In addition to one or more of the above features, or as an alternate, the system controller is configured to communicate an alert over a wireless network with one or more of a mobile device, an in-route service station and a central server when the jumper battery is controlled to boost the primary battery.

Further disclosed is a method of powering a transport refrigeration system comprising: determining that a primary battery is unable to start an engine without boost power; and automatically boosting the primary battery with a jumper battery that is on-board and simultaneously starting the engine with the battery.

In addition to one or more of the above features, or as an alternate, the method includes automatically recharging the primary battery and the jumper battery with the engine after starting the engine by boosting the primary battery with a jumper battery that is on-board.

In addition to one or more of the above features, or as an alternate, automatically boosting the primary battery with the jumper battery and simultaneously starting the engine with the battery includes directing power from the jumper battery into a first parallel circuit that includes the engine, the primary battery and the jumper battery connected in parallel.

In addition to one or more of the above features, or as an alternate, automatically recharging the primary battery and the jumper battery with the engine after starting the engine by boosting the primary battery with the jumper battery includes directing power from the engine into a second parallel circuit that includes the engine and the jumper battery.

In addition to one or more of the above features, or as an alternate, the first parallel circuit and the second parallel circuit include a common negative path.

In addition to one or more of the above features, or as an alternate, the first parallel circuit is connected at the engine to a starter and the second parallel circuit is connected at the engine to an alternator.

In addition to one or more of the above features, or as an alternate, the method includes automatically communicating an alert that the primary battery requires service after boosting the primary battery with the jumper battery.

In addition to one or more of the above features, or as an alternate, automatically communicating the alert includes communicating the alert to one or more of a display that is on-board and a remote device over a wireless network.

In addition to one or more of the above features, or as an alternate, the remote device is one or more of a mobile device, a central hub and an in-route service station.

BRIEF DESCRIPTION OF THE FIGURES

The present disclosure is illustrated by way of example and not limited in the accompanying figures in which like reference numerals indicate similar elements.

DETAILED DESCRIPTION

Figure 1:
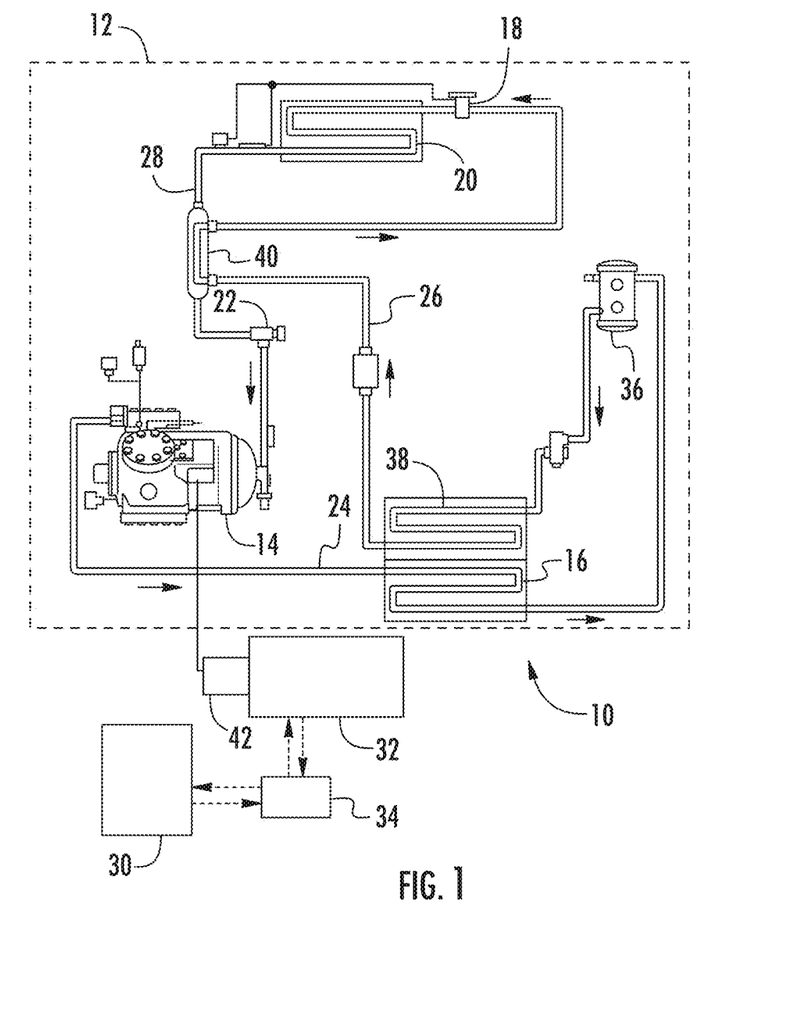
FIG. 1 shows a transport refrigeration system wherein one or more of the features of the disclosed embodiments may be utilized.
Figure 2:
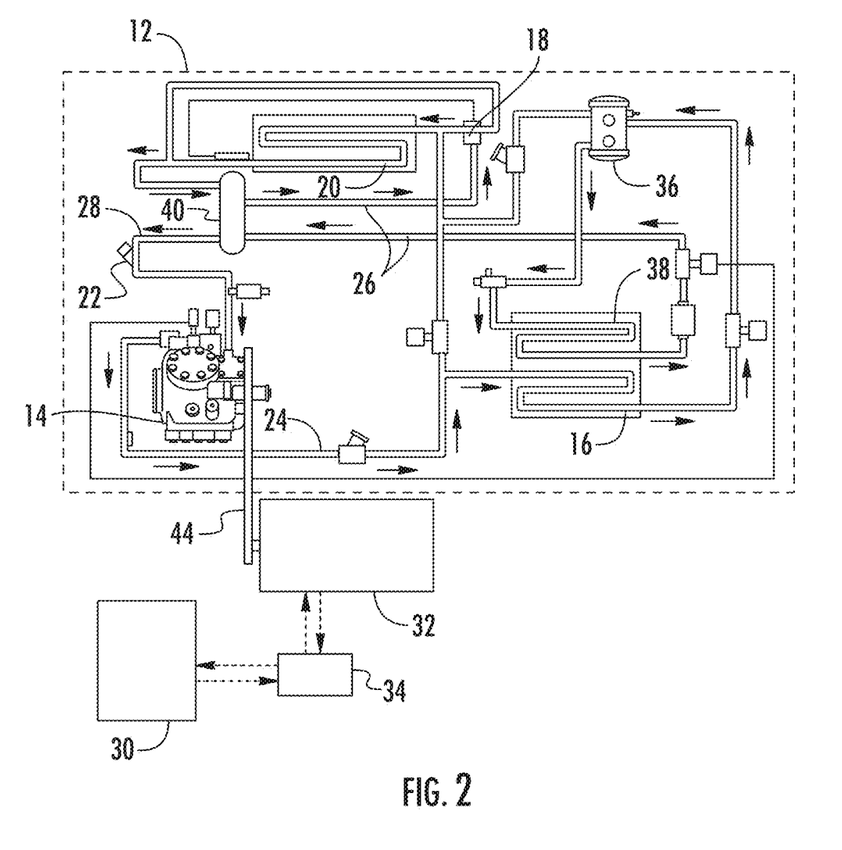
FIG. 2 shows another a transport refrigeration system wherein one or more of the features of the disclosed embodiments may be utilized.
Figure 3:
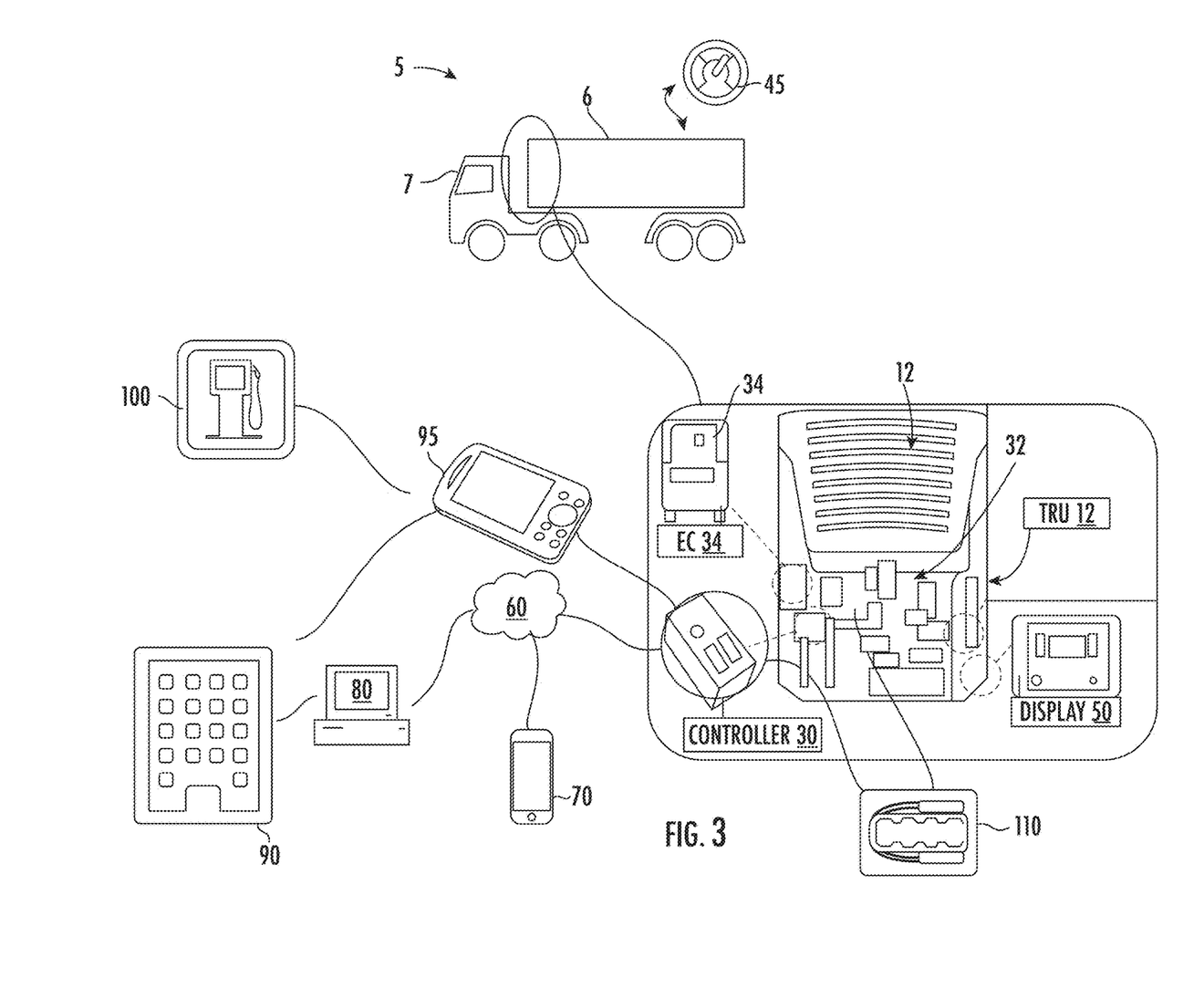
FIG. 3 shows a transport refrigeration system according to a disclosed embodiment.

Referring initially to FIGS. 1 and 2, there are depicted exemplary embodiments of transport refrigeration systems (TRS) 10 for controlling the temperature of the atmosphere within the refrigerated container 6 of the TRS 10, which may be hauled by a truck 5 (FIG. 3). The refrigerated container 6 may be for example a trailer (FIG. 3), intermodal container or similar cargo transportation unit hauled by a tractor 7 (FIG. 3) or a rail car. The TRS 10 includes a transport refrigeration unit (TRU) 12 including a compressor 14, a (refrigerant) condenser heat exchanger 16, an expansion device 18, a (refrigerant) evaporator heat exchanger 20 and a suction modulation valve 22 connected in a closed loop refrigeration circuit including refrigerant lines respectively 24, 26 and 28 and arranged in a conventional refrigeration cycle.

The TRS 10 further includes, in addition to the TRU 12, an (electronic) system controller 30, a (diesel) engine 32 and an engine controller (EC) 34. The TRS 10 is mounted as in conventional practice to an exterior wall of the truck 5 (FIG. 3) with the compressor 14 and the condenser heat exchanger 16 with its associated condenser fan(s) (not illustrated) and engine 32 disposed externally of the refrigerated container 6. The EC 34, also known as powertrain control module (PCM), engine control unit (ECU), or auto engine computer (automotive engine control module) may be considered the brain of the engine 32. A engine 32 when malfunctioning may produce in the EC 34 an activated check engine light, an engine misfiring, an engine stalling, a decreased engine performance, and/or a non-starting engine.

When the TRS 10 is operating in a cooling mode, low temperature, low pressure refrigerant vapor is compressed by the compressor 14 to a high pressure, high temperature refrigerant vapor and passed from the discharge outlet of the compressor 14 into refrigerant line 24. The refrigerant circulates through the refrigerant circuit via refrigerant line 24 to and through the heat exchange tube coil or tube bank of the condenser heat exchanger 16, wherein the refrigerant vapor condenses to a liquid, thence through the receiver 36, which provides storage for excess liquid refrigerant, and thence through the subcooler coil 38 of the condenser. The subcooled liquid refrigerant then passes through refrigerant line 24 through a first refrigerant pass of the refrigerant-to-refrigerant heat exchanger 40, and thence traverses the expansion device 18 before passing through the evaporator heat exchanger 20. In traversing the expansion device 18, which may be an electronic expansion valve (EXV) as depicted in FIG. 1 or a mechanical thermostatic expansion valve (TXV) as depicted in FIG. 2, the liquid refrigerant is expanded to a lower temperature and lower pressure prior to passing to the evaporator heat exchanger 20.

In flowing through the heat exchange tube coil or tube bank of the evaporator heat exchanger 20, the refrigerant evaporates, and is typically superheated, as it passes in heat exchange relationship return air drawn from the refrigerated container 6 passing through the airside pass of the evaporator heat exchanger 20. The refrigerant vapor thence passes through the refrigerant line 26, the refrigerant vapor traverses a second refrigerant pass of the refrigerant-to-refrigerant heat exchanger 40 in heat exchange relationship with the liquid refrigerant passing through the first refrigerant pass thereof. Before entering the suction inlet of the compressor 14, the refrigerant vapor passes through the suction modulation valve 22 disposed in refrigerant line 26 downstream with respect to refrigerant flow of the refrigerant-to-refrigerant heat exchanger 40 and upstream with respect to refrigerant flow of the compressor 14. By selectively reducing the open flow area through the suction modulation valve 22 with a system controller 30 (FIG. 3) a flow of refrigerant vapor supplied to the compressor 14 is selectively restricted, thereby reducing the capacity output of the TRS 10 and in turn reducing the power demand imposed on the engine 32.

Air drawn from within the refrigerated container 6 by the evaporator fan(s) (not shown) associated with the evaporator heat exchanger 20, is passed over the external heat transfer surface of the heat exchange tube coil or tube bank of the evaporator heat exchanger 20 and circulated back into the interior space of the refrigerated container 6. The air drawn from the refrigerated container 6 is referred to as "return air" and the air circulated back into the refrigerated container 6 is referred to as "supply air". It is to be understood that the term "air" as used herein includes mixtures of air and other gases, such as for example, but not limited to nitrogen or carbon dioxide, sometimes introduced into a refrigerated container 6 for transport of perishable product such as produce.

Although the particular type of evaporator heat exchanger 20 used is not limiting of the disclosed embodiments, the evaporator heat exchanger 20 may, for example, comprise one or more heat exchange tube coils, as depicted in the drawing, or one or more tube banks formed of a plurality of tubes extending between respective inlet and outlet manifolds. The tubes may be round tubes or flat tubes and may be finned or un-finned.

The compressor 14 may comprise a single-stage or multiple-stage compressor such as, for example, a reciprocating compressor as depicted in the exemplary embodiments shown in FIGS. 1 and 2. However, the compressor 14 may be a scroll compressor or other type of compressor as the particular type of compressor used is not germane to or limiting of the disclosed embodiments. In the exemplary embodiment of FIG. 1, the compressor 14 comprises a reciprocating compressor having a compressing mechanism, an internal electric compressor motor and an interconnecting drive shaft that are all sealed within a common housing of the compressor 14. The engine 32 drives an electric generator 42 that generates electrical power for driving the compressor motor, which in turn drives the compression mechanism of the compressor 14. The drive shaft of the engine 32 drives the generator shaft. In the embodiment of FIG. 2, the compressor 14 is a reciprocating compressor having a compressing mechanism with a shaft driven directly by the drive shaft of the engine 32, either through a direct mechanical coupling or through a belt drive 44 as illustrated in FIG. 2.

Turning to FIG. 3, additional features of the TRS 10 are illustrated. As indicated, the TRS 10, including the TRU 12, the system controller 30, the engine 32 and the EC 34, may be disposed the refrigerated container 6 of the truck 5, and hauled by the tractor 7. A thermostat 45 may be provided in the truck 5 for use by the system controller 30 in controlling the EC 34 to operate the TRS 10. A display 50 may be provided to display engine faults and other information obtained from the EC 34. The system controller 30 may be linked, for example by a network 60, to one or more of a mobile device 70 such as a cellular phone, a central server 80 located in a central hub 90, which may be fleet headquarters, and an in-route service station 100. With the configuration, the system controller 30 may communicate the engine faults and other information obtained by the EC 34, and provide other health and status data, temperature and otherwise, as may be required. The system controller 30 may also be equipped with a receiver for tracking the relative global position (GPS receiver) 95, which, along with a suitable mapping service, may be used to obtain relative distances between the truck 5, the central hub 90 and the in-route service station 100.

Figure 4:
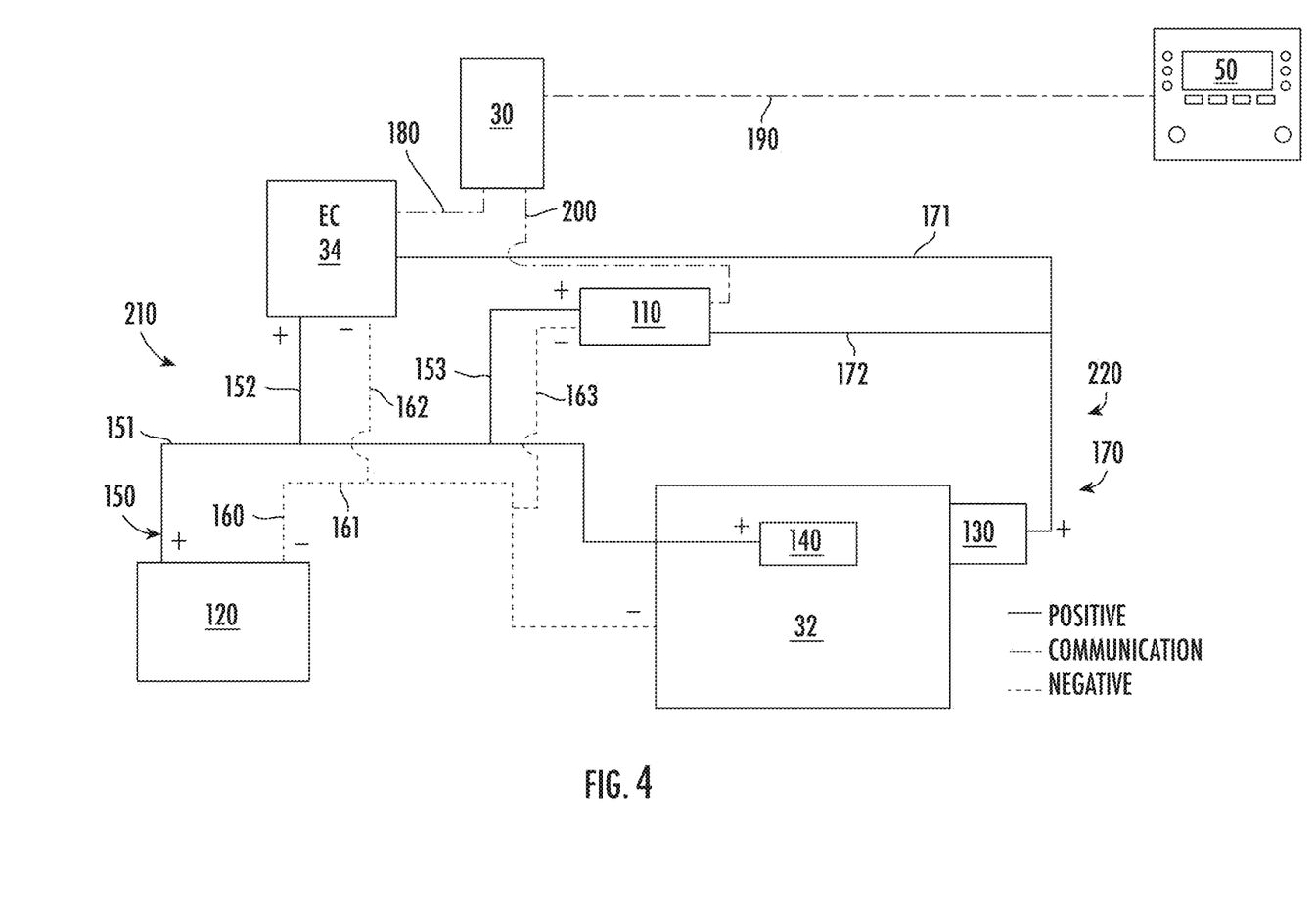
FIG. 4 shows a schematic of components of a transport refrigeration system according to a disclosed embodiment.

A jumper battery (jumper) 110 controlled by the system controller 30 may be electronically integrated into the TRS 10. The jumper battery 110 may be, for example, a high capacitance or lithium ion battery. The jumper battery 110 may be automatically engaged by the system controller 30 when the EC 34 determines that the engine 32 is not starting when expected due to an issue with a primary battery 120 for the TRS 10 (FIG. 4). The jumper battery 110 (which may be a high capacitance or a lithium-ion battery) is integrated into a battery management system, for example, controlled by the system controller 30, along with software support. This configuration may provide starting energy to the TRU 12 when it struggles to because of the primary battery 120 being dead or weak. Once started, an alternator 130 (FIG. 4) may recharge the primary battery 120 through the EC 34. The TRS 10 may provide a signal, such as an alarm on one or more of the display 50 the mobile device 70, the central server 80, and the in-route service station 100 that the jumper battery 110 was used so that the primary battery 120 may be checked for issues.

Turning to FIG. 4, an electronic schematic of the TRS 10 equipped with the jumper battery 110 is provided. The primary battery 120 is connected on a first positive path 150 to the EC 34, the jumper battery 110 and the starter 140 for the jumper battery 110. As illustrated, in one embodiment a primary line 151 of the first positive path 150 connects the primary battery 120 and the starter 140. A first branch 152 of the first positive path 150, intermediate the primary battery 120 and the starter 140, connects to the EC 34. A second branch 153 of the first positive path 150, intermediate the first branch 152 of the first positive path 150 and the starter 140, connects to the jumper battery 110.

The primary battery 120 is connected on a first negative path 160 to the EC 34, the jumper battery 110 and the engine 32. As illustrated, in one embodiment a primary line 161 of the first negative path 160 connects the primary battery 120 and the engine 32. A first branch 162 of the first negative path 160, intermediate the primary battery 120 and the engine 32, connects to the EC 34. A second branch 163 of the first negative path 160, which is a common negative path, intermediate the first branch 162 of the first negative path 160 and the starter 140, connects to the jumper battery 110.

The alternator 130 is connected on a second positive path 170 to the jumper battery 110 and the EC 34. As illustrated, a first branch 171 of the second positive path 170 is connected to the system controller 30. A second branch 172 of the second positive path 170 is connected to the jumper battery 110.

Thus, as indicated, a first parallel connection 210 exists between the primary battery 120, the EC 34, the jumper battery 110 and the engine 32 through the starter 140. Though the first parallel connection 210, the primary battery 120 and jumper battery 110 are both configured to provide power to the starter 140. A second parallel connection 220 exists between the EC 34, the jumper battery 110, the engine 32 through the alternator 130, and the primary battery 120 through the EC 34. Though the second parallel connection 220, the primary battery 120 and jumper battery 110 are both configured to be charged by the alternator 130.

Further, the system controller 30 is configured to communicate over a plurality of communication paths. For example, the system controller 30 is connected on a first communication path 180 to the EC 34, on a second communication path 190 to the display 50, and a third communication path 200 to the jumper battery 110.

With the above connections, the jumper battery 110, when engaged by the EC 34, transfers stored peak amperage to the primary battery 120 and boosts cranking amps of the primary battery 120. After usage, the jumper battery 110 will be recharged by the alternator 130 of the engine 32 while the engine 32 is running.

Figure 5:
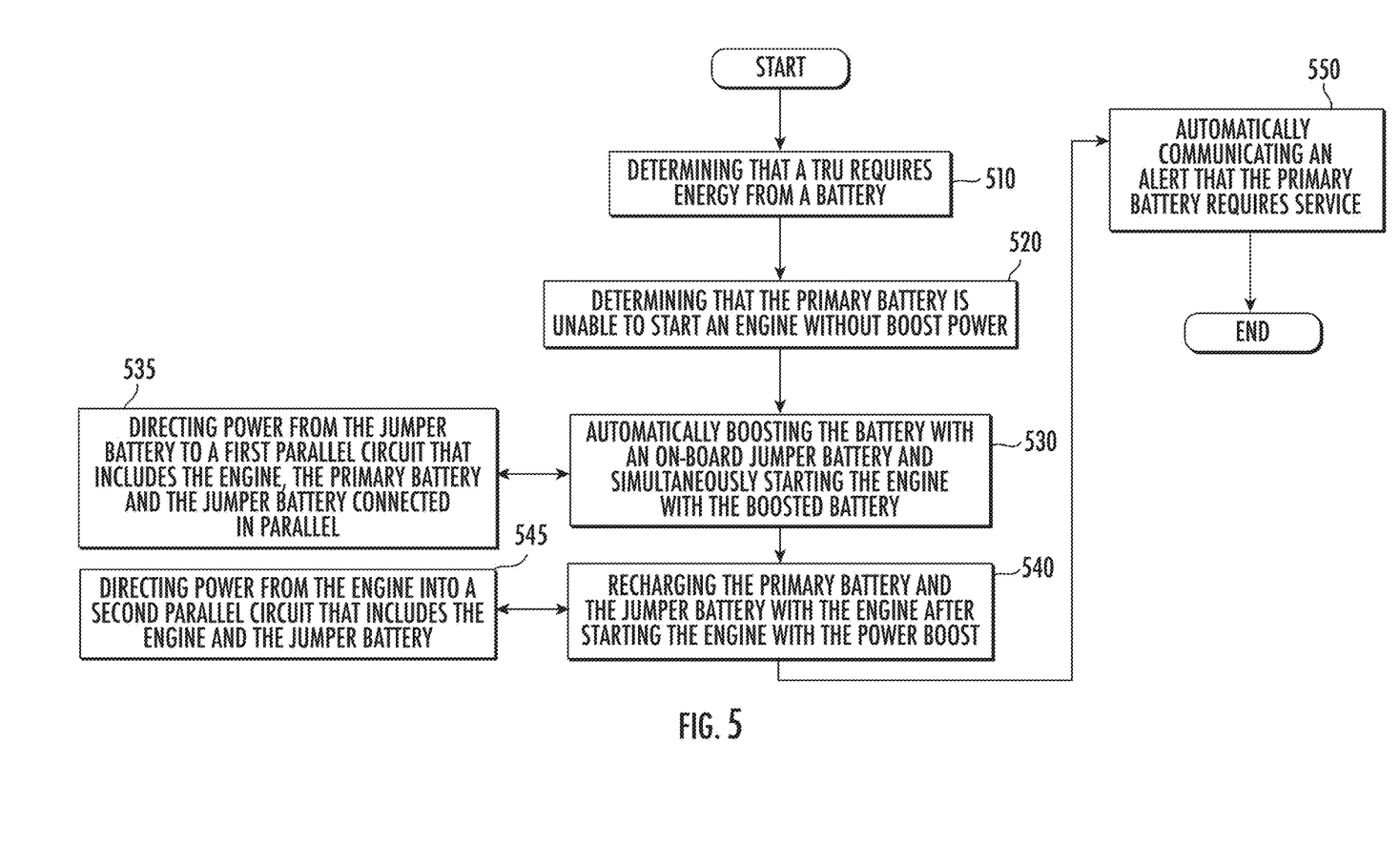
FIG. 5 shows a method of starting an engine for a transport refrigeration system according to a disclosed embodiment.

Turning to FIG. 5, disclosed is a method of powering a TRS 10. The method includes block 510 of determining that a TRU 12 requires energy from a primary battery 120, to start the engine 32. Block 520 includes determining that the primary battery 120 is unable to start the engine 32 without boost power. Block 530 includes automatically boosting the primary battery 120 with the jumper battery 110, which is on-board, and simultaneously starting the engine 32 with the primary battery 120 that has been boosted. In one embodiment, block 530 includes block 535 of directing power from the jumper battery into a first parallel circuit that includes the engine, the primary battery and the jumper battery connected in parallel. Block 540 includes recharging the primary battery 120 and the jumper battery 110 with the engine 32 after starting the engine 32 with the power boost of the primary battery 120 by the jumper battery 110. In one embodiment block 540 includes block 545 of directing power from the engine into a second parallel circuit that includes the engine and the jumper battery. In one embodiment the first parallel circuit is connected at the engine to a starter and the second parallel circuit is connected at the engine to an alternator.

Block 550 includes automatically communicating an engine alert that the primary battery 120 requires service. In one embodiment block 530 includes communicating the alert to one or more of a display 50, which may be on-board, and a remote device over a wireless network. In one embodiment the remote device is one or more of a mobile device 70, a central server 80 and an in-route service station 100. In one embodiment block 510 includes determining in-route that the primary battery 120 is unable to start without boost power and block 520 includes automatically boosting the primary battery 120 with the jumper battery 110 while in route. In one embodiment block 520 includes delivering booster power in a parallel connection between the jumper battery 110, the primary battery 120 and the engine 32. In one embodiment, block 520 includes delivering booster power in a parallel connection between the jumper battery 110, the primary battery 120, the engine 32 and the EC 34.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A transport refrigeration system comprising:
an engine that is dedicated to the transport refrigeration system, wherein the engine includes a starter and an alternator;
a primary battery that is dedicated to the transport refrigeration system, the primary battery being electrically connected to the engine; and
a jumper battery electrically connected to the primary battery, the jumper battery configured to automatically boost the primary battery when the primary battery fails to start the engine;
an engine controller, the engine, the primary battery and the jumper battery are connected in parallel in a first parallel circuit; the engine controller, the engine and the jumper battery are connected in parallel in a second parallel circuit, wherein:
the first parallel circuit includes a first positive path and a first negative path, wherein: the first positive path is connected to the starter, the primary battery, the engine controller, and the jumper battery; and the first negative path is connected to the engine, the primary battery, the jumper battery, and the engine controller; and
the second parallel circuit includes a second positive path and the first negative path, wherein the second positive path is connected to the alternator, the jumper battery, and the engine controller.

2. The system of claim 1, comprising:
a system controller configured to communicate with the engine controller and the jumper battery by respective communication paths, and control the jumper battery to boost the primary battery when the engine fails to start.

3. The system of claim 2, comprising:
a display that is dedicated to the transport refrigeration system,
wherein the engine controller is connected by another communication path to the display to provide an alert when the jumper battery is controlled to boost the primary battery.

4. The system of claim 3, wherein:
the system controller is configured to communicate an alert over a wireless network with one or more of a mobile device, an in-route service station and a central server when the jumper battery is controlled to boost the primary battery.

5. A method of powering the transport refrigeration system of claim 1, comprising:
determining that the primary battery is unable to start the engine without boost power; and
automatically boosting the primary battery with the jumper battery that is on-board and simultaneously starting the engine with the battery.

6. The method of claim 5, comprising automatically recharging the primary battery and the jumper battery with the engine after starting the engine by boosting the primary battery with the jumper battery that is on-board.

7. The method of claim 6, wherein automatically boosting the primary battery with the jumper battery and simultaneously starting the engine with the battery includes directing power from the jumper battery into the first parallel circuit that includes the engine, the primary battery and the jumper battery connected in parallel.

8. The method of claim 7, wherein automatically recharging the primary battery and the jumper battery with the engine after starting the engine by boosting the primary battery with the jumper battery includes directing power from the engine into the second parallel circuit that includes the engine and the jumper battery.

9. The method of claim 8, wherein the first parallel circuit and the second parallel circuit include a common negative path.

10. The method of claim 9, wherein the first parallel circuit is connected at the engine to a starter and the second parallel circuit is connected at the engine to an alternator.

11. The method of claim 5, comprising automatically communicating an alert that the primary battery requires service after boosting the primary battery with the jumper battery.

12. The method of claim 11, wherein automatically communicating the alert includes communicating the alert to one or more of a display that is on-board and a remote device over a wireless network.

13. The method of claim 12, wherein the remote device is one or more of a mobile device, a central hub and an in-route service station.

\* \* \* \* \*